US008683916B2

(12) United States Patent
Khan et al.

(10) Patent No.: US 8,683,916 B2
(45) Date of Patent: Apr. 1, 2014

(54) FRYING METHOD AND APPARATUS

(75) Inventors: Ahmed Nadim Khan, Burton on Trent (GB); Keith Robert Johnson, Oak Point, TX (US); Nico Vandecasteele, Veurne (BE)

(73) Assignee: Frito-Lay Trading Company GmbH, Berne (CH)

( * ) Notice: Subject to any disclaimer, the term of this patent is extended or adjusted under 35 U.S.C. 154(b) by 0 days.

(21) Appl. No.: 13/877,933

(22) PCT Filed: Oct. 6, 2011

(86) PCT No.: PCT/EP2011/067433
§ 371 (c)(1),
(2), (4) Date: Jul. 18, 2013

(87) PCT Pub. No.: WO2012/045800
PCT Pub. Date: Apr. 12, 2012

(65) Prior Publication Data
US 2013/0287916 A1 Oct. 31, 2013

(30) Foreign Application Priority Data
Oct. 6, 2010 (GB) .................................. 1016822.7

(51) Int. Cl.
*A47J 37/12* (2006.01)
(52) U.S. Cl.
USPC .............................................. 99/403; 99/339
(58) Field of Classification Search
USPC ............................................................ 99/403
See application file for complete search history.

(56) References Cited

U.S. PATENT DOCUMENTS

| 4,438,685 A | * | 3/1984 | Haas et al. ...................... 99/342 |
| 4,941,400 A | | 7/1990 | Moore |
| 5,398,668 A | | 3/1995 | Daneshvar |
| 5,454,296 A | | 10/1995 | Beardsley |
| 6,235,210 B1 | | 5/2001 | Saksena |

FOREIGN PATENT DOCUMENTS

| EP | 0083429 A1 | 7/1983 |
| EP | 0426516 A1 | 5/1991 |
| EP | 2140790 A1 | 1/2010 |
| WO | 9804174 A1 | 2/1998 |

OTHER PUBLICATIONS

McKee: Energy Recovery From Potato Chip Fryers; Proceedings from the Second Industrial Energy Technology Conference Houston, TX, Apr. 13-16, 1980.*
Giles: Food Manufacturing: Brainstorm: Energy Efficiency; Dec. 9, 2010.*
Wisconsin Sustainable Business Council: Best Management Practices: Frito Lay Heat Recover Systems; printed Oct. 8, 2013.*
Pigeaud: EP 735325 A1; publication date: Oct. 2, 1996.*

* cited by examiner

*Primary Examiner* — Patricia George
(74) *Attorney, Agent, or Firm* — Colin P. Cahoon; Amanda K. Jenkins; Carstens & Cahoon, LLP

(57) ABSTRACT

An apparatus for frying foodstuffs, the apparatus comprising a fryer having inlet and outlet longitudinal ends, an oil recirculating system coupled to the fryer, a heat exchanger for heating the oil in the oil recirculating system, a hood above the fryer for collecting steam generated during the frying process, a conduit for conveying steam from the hood, and a compressor for compressing the steam, the compressor having an input connected to the conduit and an output for compressed steam connected to the heat exchanger.

24 Claims, 1 Drawing Sheet

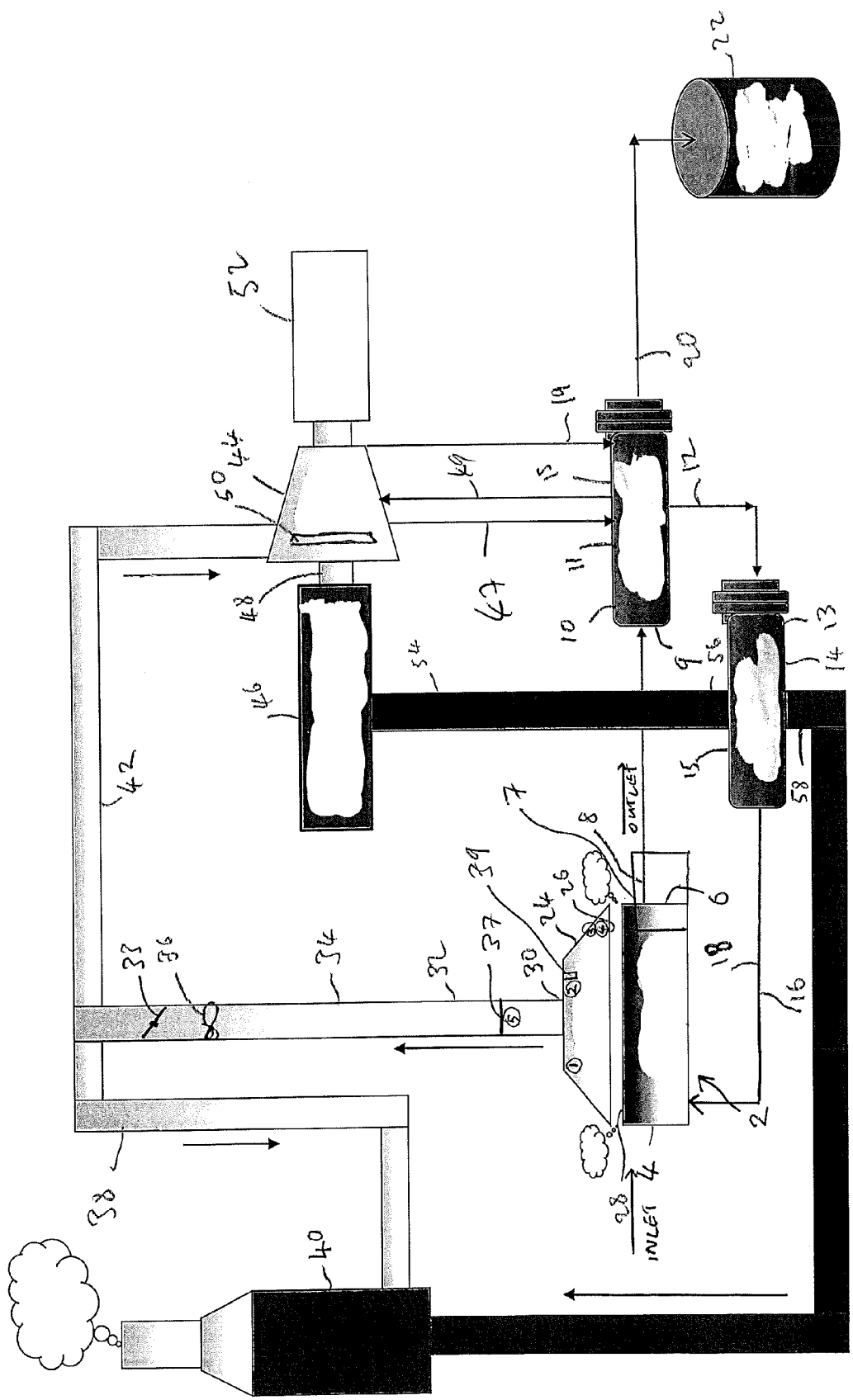

FRYING METHOD AND APPARATUS

CROSS-REFERENCE TO RELATED APPLICATIONS

This application is a 371 National Stage Application claiming priority to PCT Application No. PCT/EP2011/067433 filed Oct. 6, 2011, which claims priority to Great Britain Application No. 1016822.7 filed Oct. 6, 2010, now GB Patent 2484317 issued Mar. 20, 2013, the technical disclosures of which are hereby incorporated by reference.

BACKGROUND OF THE INVENTION

1. Technical Field

The present invention relates to a frying method and a frying apparatus and in particular to such a method and apparatus which have high energy efficiency, and low waste heat.

2. Description of Related Art

The present invention has particular application in the manufacture of snack foods, more particularly potato chips.

Frying processes are commonly used to produce a variety of different fried foodstuffs. Frying is particularly used to cook snack food products such as potato chips. In potato chip manufacture, cut slices of raw potato are cooked in a fryer containing cooking oil at an elevated temperature. Energy is required to heat the oil and maintain it at the desired cooking temperature. In addition, the frying process dehydrates the potato slices and a large volume of steam is generated which is typically captured by a hood disposed over the fryer and exhausted to the atmosphere, or the steam is passed into a thermal oxidiser for volatile destruction.

There is a generally recognised desire in the snack food manufacturing art to reduce the energy costs and waste heat generation of the frying apparatus. However, it is also necessary to ensure that the frying process and apparatus still produce a high quality product to the consumer which meets customer acceptance and is reliably and consistently achievable despite high production volumes. In particular, potato chips are normally required to meet very strict customer acceptance criteria for the respective product, for example having specific moisture and oil-in-chip contents, and the desired taste, organoleptic and other sensory attributes.

SUMMARY OF THE INVENTION

The present invention aims to provide a method and apparatus for frying foodstuffs, such as snack foods and most particularly potato chips, which can provide enhanced energy efficiency and reduced waste heat, in particular reduced waste steam production.

The present invention accordingly provides an apparatus for frying foodstuffs, the apparatus comprising a fryer having inlet and outlet ends, an oil recirculating system coupled to the fryer, a heat exchanger for heating the oil in the oil recirculating system, a hood above the fryer for collecting steam generated during the frying process, and a compressor for compressing the collected steam, the compressor having an input for inputting steam from the hood and an output for outputting compressed steam to the heat exchanger.

The apparatus may further comprise a gas-powered engine for driving the compressor.

The apparatus may further comprise a second heat exchanger for heating the oil in the oil recirculating system, the gas-powered engine having an exhaust for combustion gases connected to the second heat exchanger.

The apparatus may further comprise an electrical generator connected to the gas-powered engine to generate electrical power to drive the compressor. The gas-powered engine may be a gas turbine.

The apparatus may further comprise a tank for collecting condensed steam from the heat exchanger.

The apparatus may further comprise a controller for controlling steam pressure within the hood so as to be greater than atmospheric pressure. This can control steam quality prior to compression by the compressor.

The apparatus may further comprise at least one of a fan and a damper, located in a conduit for conveying steam from the hood, for controlling the steam pressure within the hood.

The apparatus may further comprise a sensor within at least one of the hood and the conduit, the sensor providing an input to the controller for controlling the steam pressure within the hood so as to be greater than atmospheric pressure.

Optionally, a substantially vertically oriented exhaust stack extends upwardly away from the hood.

Preferably, the apparatus further comprises an intercooling line for conveying intercooling steam from the compressor to the heat exchanger and a return line from the heat exchanger to the compressor for returning cooled vapour to the compressor.

The present invention further provides an apparatus for frying foodstuffs, the apparatus comprising a fryer having inlet and outlet ends, a conveyor for removing fried foodstuffs from oil in the fryer at the outlet end, a hood above the fryer for collecting steam generated during the frying process, the hood extending at least partially over the conveyor, and a pressurising system for pressurising the steam in the hood to a pressure greater than atmospheric pressure.

Optionally, a lower periphery of the hood covers substantially all of an upper periphery of the fryer and at least a portion of the conveyor from the fryer.

The present invention yet further provides a method of frying foodstuffs using recirculated oil, the method including the step of heating recirculated oil from a fryer using a heat exchanger receiving a heat input from steam generated during the frying process.

Optionally, the steam input to the heat exchanger is compressed by a compressor to a pressure of from $10 \times 10^5$ Pa absolute to $15 \times 10^5$ Pa absolute.

Optionally, the steam input to the heat exchanger has a temperature of from 190 to 220° C.

Optionally, the compressor is driven by a gas-powered engine.

Optionally, the gas-powered engine has an exhaust for combustion gases and the exhaust is connected to a second heat exchanger for heating the recirculated oil.

Optionally, the gas-powered engine is connected to an electrical generator for generating electrical power to drive the compressor. The electrical generator may be integral with the gas-powered engine.

Optionally, the gas-powered engine is a gas turbine.

Optionally, the method further includes the step of collecting condensed steam from the heat exchanger.

Optionally, the method further includes the steps of collecting steam from the frying process within a hood above the fryer and controlling steam pressure within the hood so as to be greater than atmospheric pressure.

Optionally, the steam pressure within the hood has a back pressure over the fryer.

Optionally, the steam pressure within the hood is from greater than $1 \times 10^5$ Pa absolute to $1.5 \times 10^5$ Pa absolute.

Optionally, the steam temperature within the hood is from 100 to 155° C.

Optionally, the method includes sensing a parameter selected from pressure, temperature or oxygen content above the fryer and controlling the steam pressure within the hood based on the sensed parameter.

Optionally, steam generated during the frying process is collected within a substantially vertically oriented exhaust stack.

The present invention yet further provides a method of frying foodstuffs, the method including the steps of:

(a) providing a fryer having inlet and outlet ends;
(b) removing fried foodstuffs from oil in the fryer at the outlet end using a conveyor;
(c) collecting steam generated during the frying process in a hood located above the fryer, the hood extending at least partially over the conveyor; and
(d) pressurising the steam in the hood to a pressure greater than atmospheric pressure.

Optionally, the pressurised steam increases the temperature of the fried foodstuffs on the conveyor.

Optionally, the temperature within the hood is at least 100° C. Further optionally the temperature within the hood between the inlet and outlet ends varies by no more 50° C.

The present invention yet further provides a method of reducing the oil content of fried foodstuffs fried in a continuous fryer, the method including the step of: providing steam at a pressure greater than atmospheric pressure and at a temperature of at least 100° C. over at least a part of a conveyor which removes the fried foodstuffs from oil in the fryer at an outlet end of the fryer.

Optionally, the pressurised steam increases the temperature of the fried foodstuffs on the conveyor causing increased draining of oil from the fried foodstuffs.

Optionally, the oil content is reduced by 4-5 wt %, based on the weight of the oil in the fried foodstuffs.

Optionally, the oil content is reduced by 1-3 wt %, based on the total weight of the fried foodstuffs.

Typically, the foodstuffs comprise snack foods, optionally potato chips.

BRIEF DESCRIPTION OF THE DRAWINGS

An embodiment of the present invention will now be described, by way of example only, with reference to the accompanying drawings, in which:

FIG. 1 is a schematic illustration of a frying apparatus in accordance with an embodiment of the present invention.

DETAILED DESCRIPTION OF THE INVENTION

Referring to FIG. 1, there is shown a frying apparatus in accordance with a first embodiment of the present invention. A fryer 2 is a continuous fryer in which foodstuffs, such as potato chips, to be fried are fed in at one upstream longitudinal end 4, the inlet end, of the fryer 2 and the cooked foodstuff is removed at the opposite downstream longitudinal end 6, the outlet end, of the fryer 2. Correspondingly, the cooking oil flows continuously along the fryer 2 from the upstream or inlet end 4 to the downstream or outlet end 6. A conveyor 7 for removing fried foodstuffs from the oil in the fryer 2 is disposed at the outlet end 6.

Oil at a relatively high input temperature, typically from 175 to 182° C. is fed in at or adjacent to the upstream end 4 and oil at a relatively low temperature of from 150 to 155° C. is continuously removed from the fryer 2 at the downstream end 6. An outlet 8 at the downstream end 6 connects to a first side 9 of a first heat exchanger 10 which heats the oil in a first heating phase. An output line 12 from the first side 9 of the first heat exchanger 10 connects to a first side 13 of a second heat exchanger 14 which heats the oil in a second heating phase. An output line 16 from the first side 13 of the second heat exchanger 14 connects to the upstream end 4 of the fryer 2. This provides a first closed circuit 18 for recirculating the oil for the fryer 2, the recirculated oil being sequentially heated by initially the first heat exchanger 10 and subsequently the second heat exchanger 14.

On a second side 11 of the first heat exchanger 10 is at least one input 19 for a working fluid, in the form of steam, and an output 20 for condensate, in the form of water. The working fluid undergoes a phase change, from a gas to a liquid, within the second side 11 of the first heat exchanger 10 and the resultant latent heat given up is employed, together with the heat transfer resulting from the elevated input temperature of the working fluid as compared to the oil input temperature into the first side 9, to heat the oil in the first heating phase. The condensed working fluid on output 20 is received in a condensate collection tank 22. The recovered condensate from the fryer vapours is collected in the collection tank 22 which can then form a supply of water to be used elsewhere within the manufacturing plant or in the production process, for example for washing potatoes used to form the potato chips to offset or reduce fresh water consumption at the factory. The recovered water may be further cooled to ambient temperature using commercially available cooling equipment.

A hood 24 is disposed above the fryer 4 to capture steam which is generated by the dehydration of the foodstuff, typically potato slices, during the frying process. The lower periphery 26 of the fryer hood 24 covers substantially all of the upper periphery 28 of the fryer 2 so that substantially all of the steam is captured within the fryer hood 24 as it rises from the fryer oil during the frying process. The hood 24 extends at least partially over the conveyor 7, so that the fried foodstuff product on the conveyor 7 is exposed to the atmosphere within the hood 24 after removal from the oil.

The fryer hood 24 has an exit 30 connected to a conduit 32. The conduit 32 is substantially vertically oriented to form a vertically oriented fryer hood exhaust stack 34. A fan 36, driven for example by an electric motor (not shown), may be disposed within the conduit 32 to exhaust steam upwardly from the hood 24. A particulate filter 37 is located within the conduit 32 above the hood 24.

At the top of the exhaust stack 34 a first conduit branch 38 connects to a chimney 40 for exhausting a portion of the steam to atmosphere. Alternatively, the steam may be condensed and cooled to ambient temperature using commercially available cooling equipment. The water collected may be directed to the collection tank 22. A second conduit branch 42 connects to a mechanical vapour compressor 44. Valves (not shown) may be provided within the first conduit branch 38 and second conduit branch 42 for selectively opening or closing the respective branch 38, 42.

Accordingly, steam from the frying process is fed, as a gaseous working fluid, to the compressor 44 which compresses the gaseous working fluid to an even higher temperature and pressure. Such high temperature and pressure working fluid is then fed to the input 19 of the second side 11 of the first heat exchanger 10 which then transfers a large amount of energy to the fryer oil passing through the first side 9 of the first heat exchanger 10. Typically, the fryer oil is fed from the fryer 2 to the first heat exchanger 10 at an input temperature of about 150 to 155° C. and exits the first heat exchanger 10 at a temperature of about 165 to 180° C.

An engine 46 is powered by burning a combustible gas, such as natural gas. Typically, the engine 46 is a gas turbine engine. An electrical generator 52, for generating an alternating current electrical power output, is connected to the output shaft 48 of the gas engine 46 to generate electricity. The electricity is used to drive the compressor 44. The compressor 44 carries one or more rotatable compressor discs 50 for compressing the steam flow within the compressor 44.

In the embodiment, the output electrical power of the electrical generator 52 driven by the gas engine 46 is greater than the electrical power required to drive the compressor 44. The surplus electrical power output is for use on site or in the factory.

The gas engine 46 has an exhaust 54 for combustion products which is connected as an input 56 to a second side 15 of the second heat exchanger 14. An output 58 of the second side 15 of the second heat exchanger 14 connects to the chimney 40 for exhausting the combustion products from the gas engine to atmosphere.

Therefore the gas engine 46 is employed not only to provide electrical power to drive the vapour compressor 44, and optionally to generate surplus electrical power for use on site, but also to provide a high grade energy source to supplement the final proportion of energy required for oil heating, by using the exhaust gas to give up waste heat from the gas engine 44 to the oil.

The exhaust 54 feeds exhaust gas from the gas engine 46 at a typical temperature of about 300 to 500° C. and the output 58 conveys gas at a typical temperature of about 230° C. to the chimney 40.

This provide a highly energy efficient heating system for the fryer oil which also recovers waste steam to produce useful condensate, and optionally generates electricity.

In operation, the steam is collected within the fryer hood 24 and a back pressure from the steam is created in the vertically oriented fryer hood exhaust stack 34 formed by the conduit 32. The vapour compressor 44, and additionally the vertical orientation of the stack 34, cause the back pressure within the fryer hood 24. A damper 33 may be provided between the vapour compressor 44 and the fryer hood 24 to control the back pressure. A sensor 39, which may be a pressure sensor or an oxygen sensor, may be provided in the fryer hood 24 or the stack 34 to provide feed forward control of the fan 36 and/or the damper 33.

Such back pressure produces a heavy steam blanket from the frying vapours extending across substantially the entire area of the fryer hood 24 which substantially corresponds to the area of the fryer 4. This back pressure maintains a positive pressure differential, above ambient atmospheric pressure, within the hood 24. Typically, some small proportion, typically 1 to 5%, of the steam is forced out under the lower peripheral edge 26 of the fryer hood 24 as a result of the back pressure created within the fryer hood 24. However, the majority of the steam generated during the frying process is collected within the exhaust stack and the collected steam produces the heavy steam blanket. Yet further, a majority, typically 70 to 90 wt %, of the steam collected within the exhaust stack is fed to the compressor 44 to provide useful energy to heat the oil. Such a heavy steam blanket produces steam of a suitable quality for compressing to a high temperature and high pressure within the compressor 44 in order to be able to give up significant heat energy on the second side 15 of the first heat exchanger 10 for heating the oil.

Typically, the steam exiting the fryer hood 24 upwardly along the conduit 32 and entering the input of the compressor 44 is at a temperature of from 100 to 150° C., typically about 125° C., and at a pressure greater than atmospheric pressure, typically from greater than $1\times10^5$ Pa absolute to $1.5\times10^5$ Pa absolute, for example a pressure of $1.01\times10^5$ Pa absolute.

In the compressor 44, the steam is compressed to an elevated pressure and consequently is correspondingly heated to an elevated temperature. For example, the compressed steam exiting the compressor 44, and therefore fed as a working fluid to the first heat exchanger 10, is at a temperature of from 190 to 220° C., typically about 190° C., and at a pressure of from $10\times10^5$ Pa absolute to $15\times10^5$ Pa absolute.

Such high temperature and high pressure steam when passing through the second side 11 of the first heat exchanger 10 transfers a large amount of energy in the first heat exchanger 10 from the steam to the oil on the first side 9 of the first heat exchanger 10. The input steam at a temperature of typically about 190° C. is cooled within the first heat exchanger 10 and condenses to high pressure water having a temperature of typically about 170° C. which is fed to the tank 22.

In addition, intercooling heat may be recovered from the compressor 44 which conveys steam along intercooling line 47 to the second side 11 of the first heat exchanger 10, cooled vapour returning to the compressor 44 along return line 49. Plural intercooling loops may optionally be provided between the compressor 4 and the first heat exchanger 10.

Compared to a conventional industrial scale commercial potato chip fryer, the frying method and apparatus of the present invention can yield significant energy and cost savings.

For example, a conventional fryer uses a gas-powered heater to heat the oil exiting the outlet end of the fryer tank and the heated oil is recycled back to the inlet end of the fryer tank. The oil is typically heated from a temperature of about 155° C. to a temperature of 185-190° C. The steam is typically either exhausted to the atmosphere or fed into a thermal oxidiser for destruction of volatile material within the fryer vapours and then exhausted to the atmosphere. The recovery of steam not only provides a water source but recovers significant amounts of energy from the steam, both the thermal energy and the latent heat, which are used to heat the oil in the first heat exchanger after conversion of the heavy steam into a high pressure/high temperature working fluid by the compressor. The compressor is driven by an engine driven by a combustible gas and the exhaust energy is at least partly employed to heat the oil in the second heat exchanger.

The use of the frying method and apparatus of the present invention can achieve fuel savings of approximately 50% or greater as compared to the conventional fryer. In addition, water is recovered which reduces water costs elsewhere in the facility.

Surprisingly, it has been found that the provision of a heavy steam blanket above the fryer 2 can provide a reduced fat content of the snack food products, typically potato chips. The provision of the heavy steam blanket produces significantly higher temperatures in the fryer hood 24 as compared to a conventional hood where the steam is vented at atmospheric pressure or below, upwardly through the stack from the hood.

At the inlet end 4 of the fryer 2 the temperature of the steam within the hood 24 is substantially the same as in the conventional fryer. However, downstream of approximately the mid point of the fryer 2, the heavy steam blanket can preferably cause the temperature of the steam within the hood 24 to increase by approximately 40 to 45° C. as compared to the conventional fryer hood arrangement. Within the exhaust stack 34, at a location just under a conventional particulate filter which is conventionally located in the stack, the temperature was approximately 10° C. higher than in the conventional fryer hood arrangement.

This higher temperature within the fryer hood 24, particularly at locations downstream of the inlet end 4 of the fryer 2, has been found to lead to reduced oil content in the fried product, such as potato chips. The moisture content of the snack food product, particularly potato chips, was substantially unaffected, as were the taste, organoleptic and sensory qualities of the snack food product, by the provision of the heavy steam blanket causing higher hood temperatures. The presence of the heavy steam blanket at the outlet end of the fryer provides a pressure greater than atmospheric pressure which substantially prevents the ingress of cool air at the outlet end above the fryer. This in turn tends to increase the temperature of the product on an outlet conveyor for removing the fried foodstuff products from the fryer at the outlet end. The increased temperature caused the product exiting the fryer to be exposed to a higher ambient temperature, which, it is believed, caused increased oil drainage from the fried foodstuff immediately after removal from the fryer tank. The increased drainage in turn causes reduced oil content in the final snack food products.

The fried products were tested in the laboratory and the acrylamide content of the products, particularly potato chips, was found to be substantially unchanged by using the heavy stem blanket as compared to conventional steam venting to atmosphere above the fryer.

Therefore, the provision of a heavy steam blanket within the hood above the fryer was found to provide not only improved energy efficiency and recovery of waste steam but also an improved snack food product in that the snack food product contained a reduced oil content. Accordingly, the preferred embodiments of the present invention can provide a more nutritional product, without changing the taste or organoleptic or sensory qualities of the snack food product, particularly potato chips.

The present invention will now be illustrated further with reference to the following non-limiting example.

EXAMPLE 1

Potato chips were fried in a fryer having a hood configuration illustrated in FIG. 1 which generated a heavy steam blanket within the hood above the fryer. The input temperature of the oil was 187° C. and the output temperature of the oil was 160° C. Potato slices of the variety Lady Rosetta and having 23.2 wt % gross solids content were fed in at the inlet end of the fryer and fried potato chips were removed from the outlet end of the fryer by a conventional outlet conveyor.

Temperature measurements were made at position numbers 1, 2, 3 and 4 indicated in FIG. 1 and also in the stack at position 5, just under the particulate filter 37.

The temperatures measured at the start and end of the production run are illustrated in Table 1.

TABLE 1

| ° C. | Example 1 - Start | Example 1 - End |
| --- | --- | --- |
| Position 1 | 146.4 | 147.3 |
| Position 2 | 108.5 | 110.8 |
| Position 3 | 104.6 | 105.7 |
| Position 4 | 103.8 | 106.9 |
| Position 5 | 138.8 | 138.2 |

It may be seen that at the inlet end of the fryer the temperature in the hood was at least 146° C. throughout the production test. At the more downstream positions of the hood along the fryer, the temperature was lower but consistently above 100° C., including at a location (positions 3 and 4) at the product receiving end of the outlet conveyor.

The oil content of the potato chips, measured in the laboratory using nuclear magnetic residence (NMR) was 29.54 wt % based on the total weight of the potato chip.

COMPARATIVE EXAMPLE 1

Example 1 was repeated, but using conventional venting in the hood to remove the steam at a pressure of no more than atmospheric pressure. The temperatures were again measured at the same points 1 to 5 illustrated in FIG. 1. The temperatures measured at the start and end of the production run are set out in Table 2.

TABLE 2

| ° C. | Comp. Ex. 1 - Start | Comp. Ex. 1 - End |
| --- | --- | --- |
| Position 1 | 146.9 | 146.6 |
| Position 2 | 66.8 | 68.9 |
| Position 3 | 63.5 | 63.6 |
| Position 4 | 59.9 | 60.1 |
| Position 5 | 128.6 | 128.2 |

From a comparison of Tables 1 and 2 it may be seen that the use of a heavy steam blanket provided significantly higher temperatures at positions 2 to 4, typically temperature increases of at least 40° C. as compared to the temperatures measured in Comparative Example 1, with the temperature in the exhaust stack being typically about 10° C. higher.

The oil content of the potato chips, measured in the laboratory using nuclear magnetic residence (NMR) was 31.35 wt % based on the total weight of the potato chip.

The process of Example 1 of the present invention therefore produced a reduction in oil content of 1.81% based on the total weight of the potato chip as compared to the process of Comparative Example 1. The present invention can therefore be used to modify the production of potato chips from a conventional oil content of typically 32-34 wt % % based on the total weight of the potato chip to a lower oil content of typically 31-32 wt % based on the total weight of the potato chip by use of the heavy steam blanket at greater than atmospheric pressure within the hood. This can accordingly reduce the oil content by 1-3 wt %, based on the total weight of the fried foodstuffs.

Accordingly, the use of the steam blanket in Example 1 provided a 4-5 wt % drop, based on the weight of the oil in the potato chip, as compared to the use of conventional steam venting at atmospheric pressure in Comparative Example 1.

The higher temperatures in the hood allow the potato chips to be fried with the final snack food product having a reduced oil content, which improves on the traditional properties of the potato chips without affecting their taste or organoleptic properties.

The moisture content of the potato chips was also measured and was the same in Example 1 and Comparative Example 1.

The potato chip products produced in both Example 1 and Comparative Example 1 had acrylamide levels below industry acceptable standards for potato chip manufacture.

The invention claimed is:

1. An apparatus for frying foodstuffs, the apparatus comprising
    a fryer having inlet and outlet ends,
    an oil recirculating system coupled to the fryer,
    a heat exchanger for heating oil in the oil recirculating system,
    a hood above the fryer for collecting steam generated during a frying process, and a compressor for compressing the collecting steam, the compressor having an input for inputting steam from the hood and an output for outputting compressed steam to the heat exchanger.

2. An apparatus according to claim 1 further comprising a gas-powered engine for driving the compressor.

3. An apparatus according to claim 2 further comprising a second heat exchanger for heating the oil in the oil recirculating system, the gas-powered engine having an exhaust for combustion gases connected to the second heat exchanger.

4. An apparatus according to claim 2 further comprising an electrical generator connected to the gas-powered engine to generate electrical power to drive the compressor.

5. An apparatus according to claim 2 wherein the gas-powered engine is a gas turbine.

6. An apparatus according to claim 1 further comprising a tank for collecting condensed steam from the heat exchanger.

7. An apparatus according to claim 1 further comprising a controller for controlling steam pressure within the hood so as to be greater than atmospheric pressure.

8. An apparatus according to claim 7 further comprising at least one of a fan and a damper, located in a conduit for conveying steam from the hood, for controlling the steam pressure within the hood.

9. An apparatus according to claim 8 further comprising a sensor within at least one of the hood and the conduit, the sensor providing an input to the controller for controlling the steam pressure within the hood so as to be greater than atmospheric pressure.

10. An apparatus according to claim 1 wherein a substantially vertically oriented exhaust stack extends upwardly away from the hood.

11. An apparatus according to claim 1 further comprising an intercooling line for conveying intercooling steam from the compressor to the heat exchanger and a return line from the heat exchanger to the compressor for returning cooled vapour to the compressor.

12. An apparatus for frying foodstuffs, the apparatus comprising
a fryer having inlet and outlet ends,
a conveyor for removing fried foodstuffs from oil in the fryer at the outlet end,
a hood above the fryer for collecting steam generated during the frying process,
the hood extending at least partially over the conveyor,
a pressurizing system for pressurizing the collecting steam in the hood to a pressure greater than atmospheric pressure,
an oil recirculating system for introducing oil into the fryer in the vicinity of the inlet end and removing oil from the vicinity of the outlet end,
a heat exchanger for heating the oil in the oil recirculating system,
the compressor for compressing the collecting steam, having an output for outputting compressed steam to the heat exchanger.

13. An apparatus according to claim 12 wherein a lower periphery of the hood covers substantially all of an upper periphery of the fryer and at least a portion of the conveyor from the fryer.

14. An apparatus according to claim 12 wherein the pressurising system is adapted to generate a back pressure of steam within the hood.

15. An apparatus according to claim 12 wherein the pressurising system includes a conduit for conveying steam from the hood, and a compressor for compressing the steam.

16. An apparatus according to claim 15 further comprising a gas-powered engine for driving the compressor.

17. An apparatus according to claim 16 further comprising a second heat exchanger for heating the oil in the oil recirculating system, the gas-powered engine having an exhaust for combustion gases connected to the second heat exchanger.

18. An apparatus according to claim 16 further comprising an electrical generator connected to the gas-powered engine to generate electrical power to drive the compressor.

19. An apparatus according to claim 16 wherein the gas-powered engine is a gas turbine.

20. An apparatus according to any one of claim 15 further comprising a tank for collecting condensed steam from the heat exchanger.

21. An apparatus according to claim 15 further comprising a controller for controlling steam pressure within the hood so as to be greater than atmospheric pressure.

22. An apparatus according to claim 21 further comprising at least one of a fan and a damper in the conduit for controlling the steam pressure within the hood.

23. An apparatus according to claim 21 further comprising a sensor within at least one of the hood and the conduit, the sensor providing an input to the controller for controlling the steam pressure within the hood so as to be greater than atmospheric pressure.

24. An apparatus according to claim 15 wherein the conduit forms a substantially vertically oriented exhaust stack.

* * * * *